United States Patent
Bohle (10) Patent No.: US 8,224,757 B2
(45) Date of Patent: Jul. 17, 2012

(54) CURRICULUM MANAGEMENT SYSTEM

(75) Inventor: Holger Bohle, Walldorf (DE)

(73) Assignee: SAP AG, Walldorf (DE)

( * ) Notice: Subject to any disclaimer, the term of this patent is extended or adjusted under 35 U.S.C. 154(b) by 3365 days.

(21) Appl. No.: 10/772,081

(22) Filed: Feb. 3, 2004

(65) Prior Publication Data

US 2004/0210461 A1    Oct. 21, 2004

Related U.S. Application Data

(60) Provisional application No. 60/463,112, filed on Apr. 15, 2003.

(51) Int. Cl.
*G06Q 50/00* (2012.01)
(52) U.S. Cl. .................................................. 705/326
(58) Field of Classification Search .................. 705/1
See application file for complete search history.

(56) References Cited

U.S. PATENT DOCUMENTS

| | | | |
|---|---|---|---|
| 5,008,853 A | 4/1991 | Bly et al. | |
| 5,310,349 A | 5/1994 | Daniels et al. | |
| 5,395,243 A | 3/1995 | Lubin et al. | |
| 5,584,699 A | 12/1996 | Silver | |
| 5,675,802 A | 10/1997 | Allen et al. | |
| 5,692,125 A * | 11/1997 | Schloss et al. | 705/9 |
| 5,788,508 A | 8/1998 | Lee et al. | |
| 5,802,514 A | 9/1998 | Huber | |
| 5,881,315 A | 3/1999 | Cohen | |
| 6,011,949 A | 1/2000 | Shimomukai | |
| 6,014,134 A | 1/2000 | Bell et al. | |
| 6,016,335 A * | 1/2000 | Lacy et al. | 379/67.1 |
| 6,091,930 A | 7/2000 | Mortimer et al. | |
| 6,099,320 A * | 8/2000 | Papadopoulos | 434/322 |
| 6,112,049 A | 8/2000 | Sonnenfeld | |
| 6,134,552 A | 10/2000 | Fritz et al. | |
| 6,148,338 A | 11/2000 | Lachelt et al. | |
| 6,149,438 A | 11/2000 | Richard et al. | |
| 6,149,441 A | 11/2000 | Pellegrino et al. | |
| 6,162,060 A | 12/2000 | Richard et al. | |
| 6,164,974 A | 12/2000 | Carlile et al. | |
| 6,175,841 B1 | 1/2001 | Loiacono | |
| 6,315,572 B1 | 11/2001 | Owens et al. | |

(Continued)

FOREIGN PATENT DOCUMENTS

GB    2373625 A    9/2002

(Continued)

OTHER PUBLICATIONS

The Columbia Institute; e-Campus School Policy Manual. <http://web.archive.org/web/20021201192300/http://www.columbiainstitute.org/> Dec. 1, 2002 Jan. 22, 2009.*

(Continued)

*Primary Examiner* — Gabrielle McCormick
*Assistant Examiner* — Shaun Sensenig
(74) *Attorney, Agent, or Firm* — Finnegan, Henderson, Farabow, Garrett & Dunner, LLP (57) ABSTRACT

Methods and systems, including computer program products, for use with a curriculum management system that manages a curriculum comprised of at least a course. The method includes scheduling a booking of the course for a learner; receiving input requesting a modification to the booking; determining whether the booking is an individual booking or a curriculum booking; and processing the modification based on whether the booking is an individual booking or a curriculum booking.

16 Claims, 5 Drawing Sheets

U.S. PATENT DOCUMENTS

| | | | |
|---|---|---|---|
| 6,336,813 | B1 | 1/2002 | Siefert |
| 6,347,333 | B2 * | 2/2002 | Eisendrath et al. ........... 709/217 |
| 6,347,943 | B1 | 2/2002 | Fields et al. |
| 6,368,110 | B1 | 4/2002 | Koenecke et al. |
| 6,370,355 | B1 | 4/2002 | Ceretta et al. |
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,430,563 | B1 | 8/2002 | Fritz et al. |
| 6,470,171 | B1 | 10/2002 | Helmick et al. |
| 6,514,085 | B2 | 2/2003 | Slattery et al. |
| 6,527,556 | B1 | 3/2003 | Koskinen |
| 6,587,668 | B1 | 7/2003 | Miller et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B2 | 11/2003 | Kilgore |
| RE38,432 | E | 2/2004 | Fai et al. |
| 6,709,330 | B1 | 3/2004 | Klein et al. |
| 6,729,885 | B2 | 5/2004 | Stuppy et al. |
| 6,990,465 | B1 * | 1/2006 | Wandmacher et al. ......... 705/26 |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1 | 5/2002 | Catten et al. |
| 2002/0073063 | A1 | 6/2002 | Faraj |
| 2002/0138841 | A1 | 9/2002 | Ward |
| 2002/0142278 | A1 | 10/2002 | Whitehurst et al. |
| 2002/0188583 | A1 | 12/2002 | Rukavina et al. |
| 2003/0013073 | A1 | 1/2003 | Duncan et al. |
| 2003/0049593 | A1 | 3/2003 | Parmer et al. |
| 2003/0073063 | A1 | 4/2003 | Dattaray et al. |
| 2003/0073065 | A1 | 4/2003 | Riggs |
| 2003/0082508 | A1 | 5/2003 | Barney |
| 2003/0113700 | A1 | 6/2003 | Simon |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152903 | A1 | 8/2003 | Theilmann |
| 2003/0152904 | A1 | 8/2003 | Doty, Jr. |
| 2003/0152905 | A1 | 8/2003 | Altenhofen et al. |
| 2003/0152906 | A1 | 8/2003 | Krebs et al. |
| 2003/0157470 | A1 | 8/2003 | Altenhofen et al. |
| 2003/0163784 | A1 | 8/2003 | Daniel et al. |
| 2003/0175664 | A1 | 9/2003 | Frangenheim et al. |
| 2003/0175676 | A1 | 9/2003 | Theilmann et al. |
| 2003/0211447 | A1 | 11/2003 | Diesel et al. |
| 2003/0224339 | A1 | 12/2003 | Jain et al. |
| 2004/0081951 | A1 | 4/2004 | Vigue et al. |

FOREIGN PATENT DOCUMENTS

| | | |
|---|---|---|
| WO | WO 02/21379 A1 | 3/2002 |

OTHER PUBLICATIONS

Jörg Siekmann et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al.,"Modeling Constructivist Teaching Functionality and Structure in the KBS Hyperbook System," University of Hannover, pp. 1-12, Jun. 4, 1999.

Max Mählhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

x.hlp, "Software for faster learning," http://www.xh1p.com/home.cfm, Apr. 2003, 7 pgs.

Global Knowledge Network, Inc., "On Demand Personal Navigator," http://kp.globalknowledge.com/products/od/index.asp, Sep. 2002, 2 pgs.

U.S. Appl. No. 60/201,500, filed May 3, 2000, Adams.
U.S. Appl. No. 60/272,251, filed Feb. 28, 2001, Ward.
U.S. Appl. No. 60/329,088, filed Oct. 12, 2001, Riggs.
U.S. Appl. No. 60/334,714, filed Nov. 1, 2001, Diesel.
U.S. Appl. No. 60/400,606, filed Aug. 1, 2002, Diesel.

Hewlett Packard, "HP OpenView Integration Guide for Developers," Jul. 2002, [online], [retrieved from the Internet on Mar. 24, 2004: http://h21007.www.2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

PCT International Preliminary Report and Written Opinion, dated Nov. 3, 2005, 7 pages.

* cited by examiner

| Type of Modification | Granularity of Modification | |
|---|---|---|
| Cancellation | Curriculum / Individual | 310 |
| Re-Booking | Curriculum / Individual | |
| Follow-Up | Curriculum / Individual | |

CURRICULUM MANAGEMENT SYSTEM

CROSS-REFERENCE TO RELATED APPLICATION

This application claims priority to U.S. Provisional Application No. 60/463,112 entitled Web Based Training Curriculum, filed on Apr. 15, 2003.

BACKGROUND

This application relates to data processing by digital computer, and more particularly to curriculum management.

Electronic learning systems (ELS) provide users with the ability to access course content directly from their computers, without the need for intermediaries, such as teachers, tutors, and the like. Such computer-based systems have proven attractive for precisely this reason.

Systems exist which allow users to book ELS training electronically. Once training has been booked, however, subsequent modifications to such bookings can lead to inconsistencies, particularly in more complex ELSs that manage different forms of training.

SUMMARY OF THE INVENTION

In general, in one aspect, the invention is directed to a computer program product, tangibly embodied in an information carrier, for use with a curriculum management system that manages a curriculum comprised of at least a course. The computer program product is operable to cause a data processing apparatus to perform operations that include scheduling a booking of the course for a learner; receiving input requesting a modification to the booking; determining whether the booking is an individual booking or a curriculum booking; and processing the modification based on whether the booking is an individual booking or a curriculum booking.

In general, in another aspect, the invention is directed to a method for use with a curriculum management system that manages a curriculum comprised of at least a course. The method includes scheduling a booking of the course for a learner; receiving input requesting a modification to the booking; determining whether the booking is an individual booking or a curriculum booking; and processing the modification based on whether the booking is an individual booking or a curriculum booking.

The foregoing aspects may include one or more of the following features:

The modification may comprise re-booking; and if the booking is a curriculum booking, processing the modification may comprise not re-booking the course.

The modification may comprise re-booking the course; and if the booking is an individual booking, processing the modification may comprise performing a consistency check with respect to other courses in the curriculum; and if the consistency check is successful, re-booking the course.

The modification may comprise canceling the course; and if the booking is a curriculum booking, processing the modification may comprise not canceling the course.

The modification may comprise canceling the course; and if the booking is a curriculum booking, processing the modification may comprise canceling the course, identifying other courses for which bookings are invalidated by canceling the course, and canceling the other courses.

The modification may comprise canceling the course; the course may belong to a sequence of courses within the curriculum; and if the booking is a curriculum booking, processing the modification may comprise canceling the course; and canceling any other courses that are later in the sequence than the course.

The modification may comprise follow-up; and if the booking is a curriculum booking, processing the modification may comprise not performing the follow-up until the entire curriculum has been completed.

The modification may comprise follow-up; and if the booking is a curriculum booking, processing the modification may comprise performing the follow-up even if the entire curriculum has not been completed.

Implementations of the invention may provide one or more of the following advantages. A curriculum management system in accordance with the invention may manage of different forms of training including courses and curriculums (groups of courses). Grouping courses into a single curriculum reduces administrative effort because the curriculum encapsulates the courses contained with the curriculum and enables actions on the curriculum level to be propagated automatically to the courses contained within the curriculum. At the same time, the curriculum management system may be customized to treat a curriculum booking like a course booking, thereby returning full control back to the administrator.

A curriculum management system in accordance with the invention may maintain consistency between the handling of curriculums and the handling of courses. Bookings may be cancelled, re-booked or followed-up without rendering other bookings inconsistent.

The details of one or more implementations of the curriculum management system are set forth in the accompanying drawings and the description below. Further features, aspects, and advantages of the curriculum management system will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
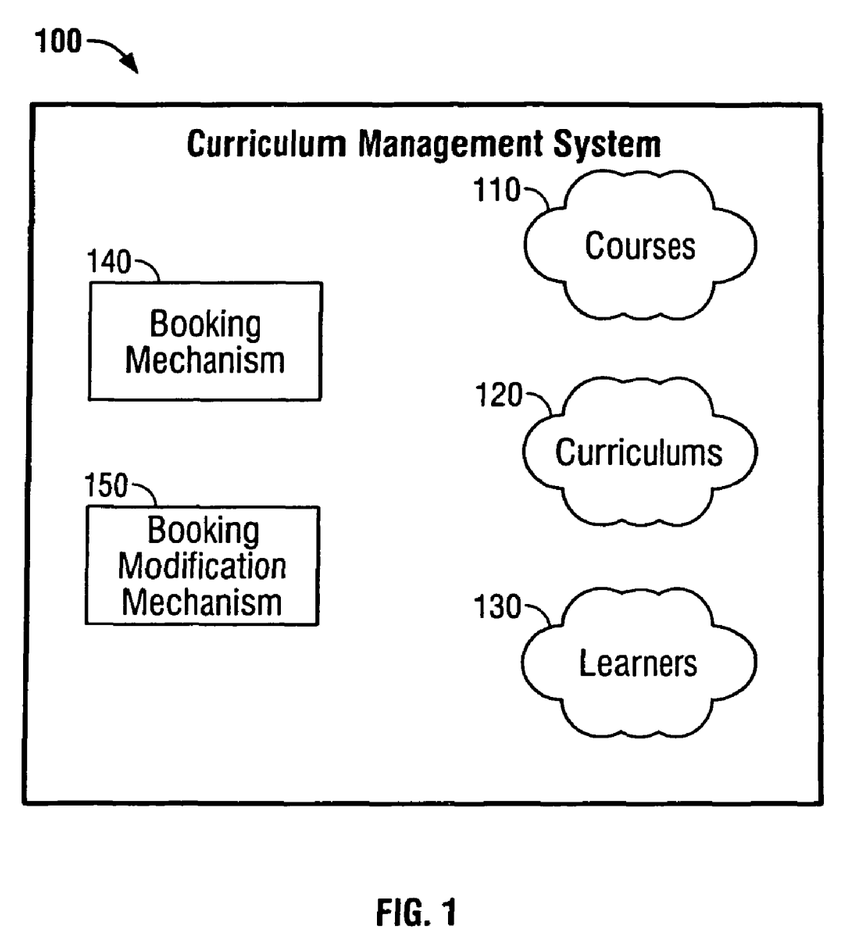
FIG. 1 is a block diagram of a curriculum management system.

FIG. 1 shows a curriculum management system 100 for an ELS. The curriculum management system manages a set of courses 110, a set of curriculums 120, and a set of learners 130 in the ELS. A course constitutes training that provides instruction about a particular topic. Associated with each course is information specifying course constraints, such as course start and end dates, course prerequisites, and qualifications imparted by the course.

The set of courses 110 can include different types of courses including web-based courses, classroom courses, and on-the-job courses. An on-the-job course is a course that includes one or more work assignments and a required time interval for completing the work assignments. A classroom course is a live course that is given by an instructor in a fixed location at a fixed time. A web-based course is a course that is delivered over the Internet. With web-based courses, there is typically not a fixed location and there often is not a fixed time either. Examples of web-based courses include on-line tutorial programs and presentations.

A curriculum is a group of two or more courses selected from a set of courses managed by the system. Within the group, the courses are arranged in a sequence that determines the order in which the courses must be taken. Associated with each curriculum is information specifying the curriculum constraints, such as curriculum start and end dates, curriculum prerequisites, and qualifications imparted by the curriculum.

A learner is a user of the ELS that is authorized to book courses or curriculums managed by the curriculum management system. For each learner, the ELS maintains a learner profile that keeps track of the learner's bookings and the qualifications earned by the learner.

Curriculum management system 100 also includes a booking mechanism 140 for booking courses and curriculums and a booking modification mechanism 150 for making modifications to bookings.

Bookings

Figure 2:
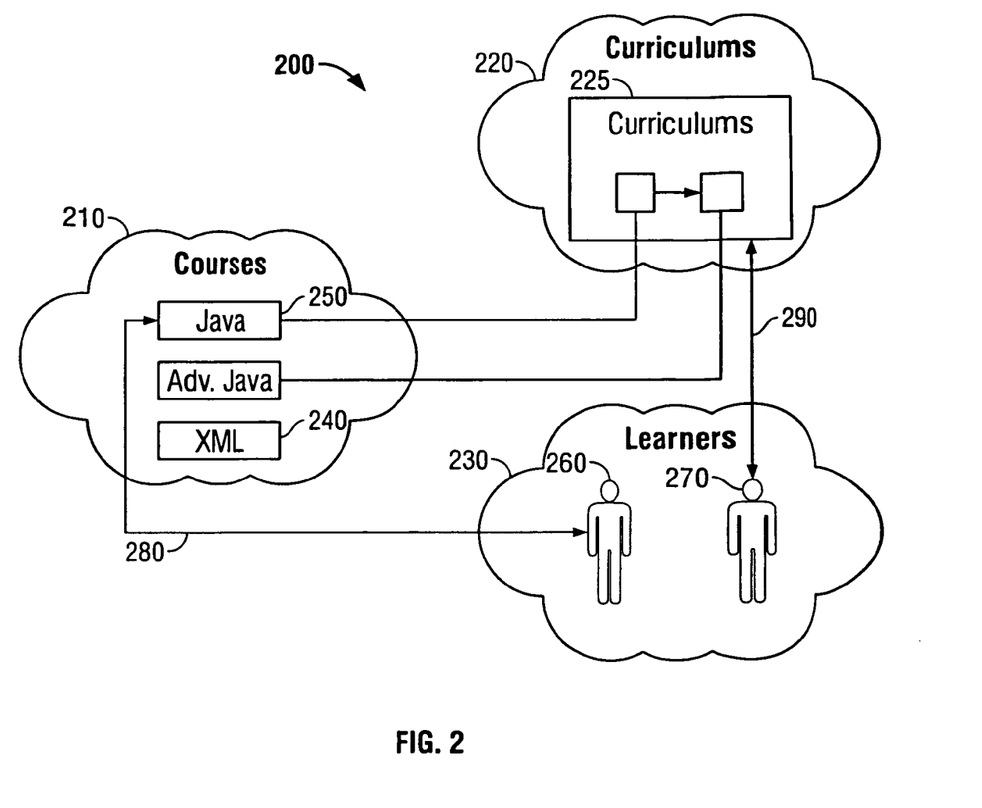
FIG. 2 is an example of a booking scenario associated with the curriculum management system.

As shown in FIG. 2, an example booking scenario 200 involves a set of courses 210, a set of curriculums 220, and a set of learners 230. The set of courses 210 includes courses 240 which may only be taken as an individual course and courses 250 which may be taken either as an individual course as part of a curriculum. In this example, the Java course, namely course 250, may be taken individually or as part of a curriculum 225. Courses are "booked", meaning that the courses are scheduled to be taken by a learner. Bookings can occur through a variety of methods. For example, a course may be booked electronically from a remote learning station, or via other means, such as by telephone.

The set of learners includes a first learner 260 and a second learner 270. In this scenario the first learner 260 books the Java course through an "individual booking", meaning that the first learner books the Java course by itself, not as part of a curriculum. The second learner 270 also books the Java course, but through a "curriculum booking" for the curriculum 225, meaning that the second learner is taking the Java course as part of curriculum 225.

Booking Modifications

Once a booking has been made, it can be modified by cancellation, re-booking, or follow-up. Bookings may be modified electronically or via other means. Cancellation removes a booking from the schedule of bookings. Re-booking shifts or reschedules a booking to a different start date. Follow-up is a bookkeeping operation that is performed by an administrator once a course or curriculum has ended. During follow-up, any qualifications that are imparted by the course or curriculum are transferred to a learner profile of a learner that successfully completed the course or curriculum (the ELS, as described below, maintains learner profiles containing learner-specific information)

In some cases, the follow-up procedure is dependent on whether the learner that completed the course booked the course as a curriculum booking or as an individual booking. In the case of a curriculum booking, before performing a follow-up, the booking mechanism 140 may need to consider additional conditions that are not required for an individual booking. An example of such an additional condition is the successful completion of a final exam or project. That is, if the learner has not successfully completed a final exam or project, the learner may be denied an indication of successful completion in the learner's profile.

In one implementation, when a course is booked, the booking mechanism 140 creates an attendance link 280 (FIG. 2) that associates the learner with the booked course. For curriculum bookings, the system creates an attendance link 290 that associates the learner with the booked curriculum and additional attendance links (not illustrated) that associate the learner with each of the courses in the booked curriculum. An attendance link indicates a valid booking. An attendance link has a defined start and end date. For classroom courses, the start and end dates of the attendance link correspond to the start and end dates of the course. For web-based trainings, the start and end dates of the attendance link correspond to the period during which time the course content is available on the web. When booking a web-based course, the learner must indicate an intended start date and end date for his participate in the course. The system then checks to make sure that the participation dates fall within the period of availability of the course content.

The system uses the attendance links to identify all the bookings for a particular curriculum. For example, in one implementation, each attendance link has a curriculum participation ID field that indicates which curriculum the booking belongs to. If the booking is an individual booking, then the value of the field is null.

The system also uses the attendance links to keep track of a particular learner's training history. The system archives the attendance links for all courses completed by a particular learner. Each archived link can optionally store information about the learner's performance in the course (e.g., whether the course was successfully competed, or failed, etc.) The archived information can be used for purposes of reporting or documenting a learner's training history.

During the cancellation or follow-up process, attendance links are removed and archived. During the re-booking process, the system modifies the attendance link to point to a different occurrence of the same course or curriculum.

Potential Inconsistencies

Modifications to a booking without regard to whether the booking is an individual booking or a curriculum booking can render other bookings invalid. For example, suppose that in example scenario 200 of FIG. 2, after the bookings have been made, the booking modification mechanism 150 receives user input from both learners requesting a cancellation of their booking for the Java course, namely course 250. Suppose also that the Java course is a prerequisite to taking the rest of the curriculum 225. If the booking modification mechanism 150 were to handle both cancellation requests in the same manner, this would lead to inconsistencies because the two bookings in question have different constraints. That is, the booking for the first learner is an individual booking, while the booking for the second learner is a curriculum booking. In the latter case, canceling the booking for the Java course would render invalid the booking for the curriculum 225 because the second learner would no longer have the necessary prerequisite (i.e., the Java course) to take the rest of the curriculum 225.

To manage such potential inconsistencies, the booking modificatio mechanism 150 distinguishes between individual bookings and curriculum bookings, and handles them differently. Various implementations are possible. In one implementation, the booking modification mechanism permits booking modifications only for the curriculum as a whole (this is referred to as the "curriculum approach"). Under this approach, the requested cancellation made by the second learner in the above-described booking cancellation scenario would not be permitted by the booking modification mechanism. Under the curriculum approach, the only permissible way to cancel the booking of the Java course would be to cancel the booking to the curriculum 225 as a whole.

In some cases, the curriculum approach to cancellation may be too limiting. For example, in some cases, there may be no course prerequisites for the courses in the curriculum, so canceling a booking for one of the courses in the curriculum might not render the remaining bookings invalid.

Thus, alternatively, the booking modification mechanism 150 can be configured, e.g., by system administrators, to follow the curriculum approach for booking modifications or not to follow the curriculum approach. For each type of modification (e.g., cancellation, re-booking, or follow-up), the administrator decides whether to select the curriculum approach which allows booking modifications only for a curriculum as a whole but not for individual courses within the curriculum, or the individual approach which allows booking modifications to individual courses within a curriculum.

Figure 3:
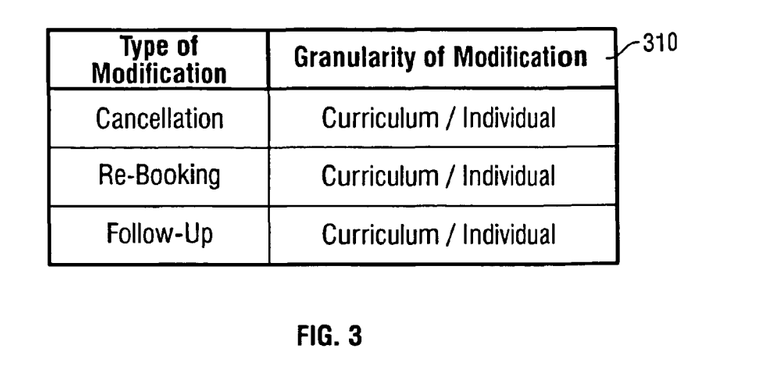
FIG. 3 is an example of granularity settings associated with the curriculum management system.

In one implementation, as illustrated in FIG. 3, the booking modification mechanism includes a granularity setting 310 that can be set to either the curriculum approach or the individual approach. As illustrated, the granularity setting can be configured differently for different types of modifications. For example, the granularity can be set to the curriculum approach for cancellations, but to the individual approach for re-bookings. Under this configuration, learners cannot cancel an individual course within a curriculum, but they can re-book the course to a different date. Other combinations are also possible, as shown.

The following describes how the booking modification mechanism performs each type of booking modification under the curriculum and individual approaches.

Cancellation

Under the curriculum approach, cancellation of bookings for individual courses within a curriculum is not permissible. Instead, the curriculum must be cancelled as a whole. By contrast, the individual approach has three variants (described below).

Under the first variant (called "Cancel Invalid Bookings"), in addition to performing a requested cancellation, booking modification mechanism 150 also performs additional cancellations to cancel any other bookings that are rendered invalid by performing the requested cancellation. This involves examining the bookings for other courses in the curriculum and checking for dependencies, for example, checking the qualifications imparted by the cancelled course against the prerequisites for the remaining courses. In this regard, each course in the ELS contains metadata that defines dependencies among the courses. In this variant, booking modification mechanism 150 examines the metadata of a target course to determine the courses that depend on the target course (i.e., the courses for which the target course is a prerequisite). Booking modification mechanism 150 in this manner identifies the courses that depend on the target course and cancels their bookings accordingly.

Under the second variant (Cancel To End), instead of examining the bookings (which can be time-consuming), booking modification mechanism 150 simply cancels any bookings for courses that are later in the curriculum sequence than the cancelled course. In this regard, a curriculum is defined by data that identifies, inter alia, the courses that make up the curriculum and the order in which those courses should be presented. As noted, individual metadata associated with a course may define dependencies. Data defining the curriculum may also keep track of dependencies among courses. In this case, booking modification mechanism 150 examines the data associated with a curriculum (and, if necessary, metadata associated with a course) to identify courses that are later in the curriculum sequence than the course targeted for cancellation.

Under the third variant, the requested cancellation is performed without performing any additional consistency measures. That is, the target course is simply cancelled without regard to dependencies. This approach could lead to inconsistencies in some cases (e.g., to cancelling a course upon which other courses in a curriculum depend), but it is made available as a configuration option because in some implementations of the ELS, there may be no dependencies among courses.

Re-Booking

Under the curriculum approach, re-booking of an individual course within a curriculum is not permissible. Instead, the curriculum must be re-booked as a whole.

Under the individual approach, individual re-bookings are permissible, but booking modification mechanism 150 first performs a consistency check before allowing the re-booking to occur. The consistency check involves checking the course dependencies to make sure that courses which must be taken prior to other courses in the curriculum have not be re-booked in a manner that violates the course dependencies. As noted above, individual course metadata and/or data that define a curriculum may be examined to determine dependencies among courses in a curriculum.

Follow-Up

Typically, for an individual booking, once the course is completed, the ELS performs follow-up (transfers, qualifications, etc.) immediately for each booking associated with the course. For curriculum bookings, the follow-up procedure involves performing follow-up at the curriculum-level and also at the course-level.

Follow-up at the curriculum-level involves transferring any qualifications that are imparted by successful completion of the curriculum. As discussed above, the successful completion of the curriculum may depend on additional conditions beyond successful completion of each course within the curriculum.

Follow-up at the course-level involves transferring any qualifications that are imparted by successful completion of the course. An issue that arises with respect to course-level follow-up is: Should the course-level follow-up for a particular course be performed as soon as the course is completed, or should the follow-up be deferred until all remaining courses in the curriculum have been completed?

Under the curriculum approach, the booking modification mechanism 150 determines whether the learner booked the course as an individual booking or as a curriculum booking. If the booking is an individual booking, booking modification mechanism 150 performs follow-up without waiting for completion of other courses. If the booking is a curriculum booking, booking modification mechanism 150 defers follow-up until the entire curriculum (or some portion thereof) is complete. For curriculum bookings, booking modification mechanism 150 performs follow-up at both the curriculum-level and at the course-level (e.g., performing curriculum-level follow-up before performing course-level follow-up). What this means is that booking modification mechanism 150 updates a learner's profile, e.g., to reflect successful completion of both a curriculum and a course within that curriculum. Other information may also be updated.

Under the individual approach, booking modification mechanism 150 does not defer course-level follow-up for curriculum bookings. Instead, all bookings (curriculum or individual) can be followed-up right away at the course-level, and then for the curriculum bookings, an additional follow-up occurs at the curriculum-level once the entire curriculum is completed.

The booking modification mechanism 150 can be configured with respect to whether the curriculum approach or the individual approach is used for the follow-up procedure.

The above-described techniques have been described in the context of a curriculum management system for an ELS. In addition to the curriculum management system, the ELS generally includes other systems as well, for example, an authoring system for creating course content, a content management system for storing created content, and/or a player system for delivering course content. One such ELS is the Learning Solution® available from SAP® AG of Walldorf, Germany.

Figure 4:
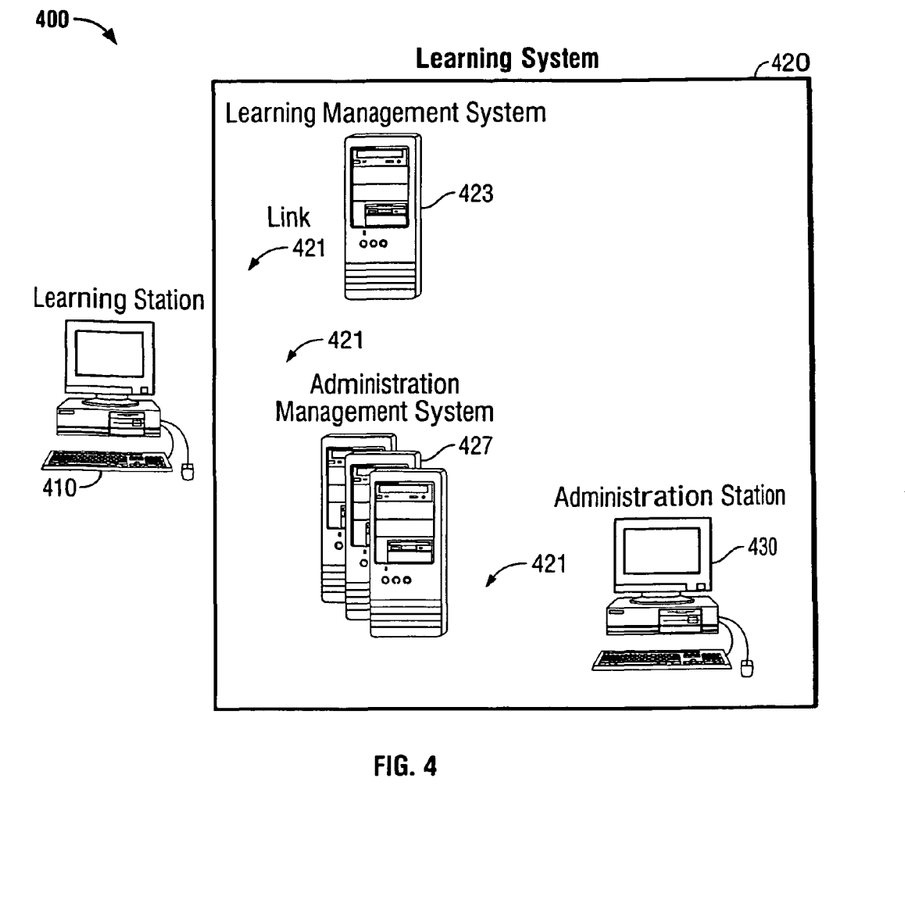
FIG. 4 is a block diagram of an implementation of an ELS in which the curriculum management system may be used.

FIG. 4 shows one implementation 400 of an ELS in which the curriculum management techniques described herein may be used. In this implementation, the ELS includes a learning system 420 and a learning station 410 through which a learner accesses the learning system 420.

Learning System

The learning system 420 includes a learning management system 423 and an administration management system 427. An administrator accesses the administration management system through an administration station 430. Although a single learning station and administration station are shown, many such stations may be provided.

Administration management system 427 includes a database that stores training materials (e.g., courses and curriculums) and information about the training materials, such as descriptions of the courses and curriculums. This information may be represented in the form of a training catalog, for example.

Administration management system 427 also includes a database of learner accounts. Each learner account includes demographic data about the learner (e.g., name, address, account number), booking information for one or more courses and/or curriculums, and a learner profile that records tests completed, skills and knowledge acquired, qualifications completed for courses and/or curriculums within the ELS. In one implementation, the administration management system is implemented using the SAP® R/3 Server, Release 4.6C extended with the Learning Solution® plug-in, available from SAP® AG of Walldorf, Germany.

Learning management system 423 includes mechanisms for presenting training materials to the learner. One such mechanism is a content player that retrieves training material from a content repository of a content management system (not shown). The content player also applies a learner-selectable learning strategy to the obtained training material to generate a navigation tree or path for the learner. The navigation tree or path is used to suggest a route through training material for the learner and to generate a presentation of training material to the learner. The content player can be implemented using a J2EE Engine such as the SAP® J2EE Engine.

Learning management system 423 exchanges information with administration management system 427 through a communication link 421. The exchange information can include information that updates the learner account information as the learner progresses through the training material to indicate, for example, competencies gained, tests passed, and training completed via the ELS.

Learning Station

Learning station 420 includes software that accesses, interprets, and presents training materials and associated information to a learner. Learning station 420 allows a learner to interact with the materials and with other aspects of the ELS.

A browser running on the learning station communicates with learning system 410 through communication link 421. The browser displays a learning portal (i.e., a user interface, which is described below with respect to FIG. 5) through which users can access learning system 410. The browser can be any software application that interprets and processes a markup language, such as Hypertext Markup Language (HTML), Standard Generalized Markup Language (SGML), Dynamic Hypertext Markup Language (DHTML), Extensible Markup Language (XML), or Extensible Hypertext Markup Language (XHTML). The functionality of the browser can be extended using a software plug-in that allows the browser to interpret, process, and present different types of information. Examples of such plug-ins are Java, Active X, JavaScript, and Flash plug-ins.

A station 430 includes similar elements as the learning station. Such elements allow the administration station to interact with administration management system 427.

Learning Portal

Figure 5:
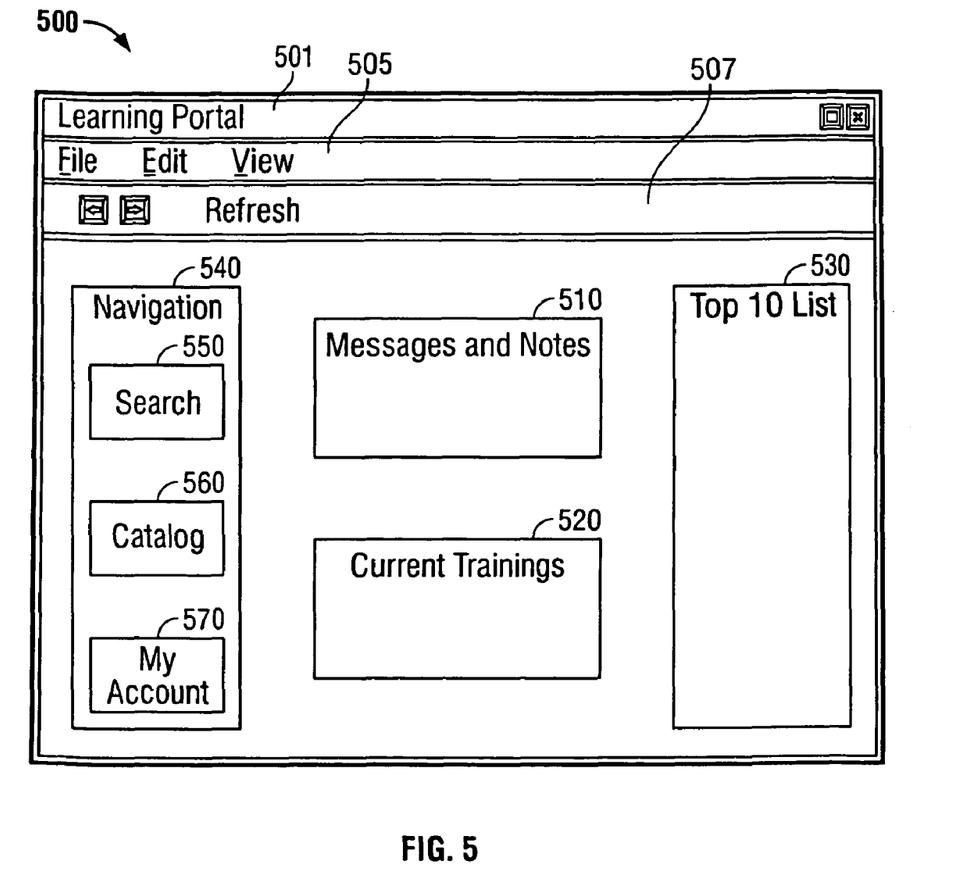
FIG. 5 is an example of an initial screen of a learning portal in the ELS.

FIG. 5 illustrates an initial screen 500 for the learning portal. Initial screen 500 includes a title bar 501, a menu bar 505, and a tool bar 507. In addition, initial screen 500 includes a number of sections, including a message and notes section 510, a current activities section 520, a Top 10 List section 530, and a navigation section 540.

Message and notes window 510 section provides access to information about training provided via the ELS. For example, an employer may use the messages and notes section to distribute company-wide information about training to all employees. Messages and notes section 510 also may be used by the employer to determine whether an employee has received, read, and/or confirmed receipt of information about training. For example, administration management system 427 may determine when a message is delivered to an employee, when an employee accesses a note or message using message and notes section 510, and/or when an employee confirms or acknowledges receipt of a message.

Message and notes section 510 includes a mandatory trainings section containing training that is prescribed for the learner, a qualifications section displaying essential requirements for the learner (e.g., related to a learner's job description), and an area displaying scheduled dates of training for which the employee is prebooked (not shown).

Current training activities section 520 provides the learner with detailed information on personal training activities that are planned and/or are currently in process. Current training activities may include, but are not limited to, training that the learner has booked for a fixed date in the future (e.g., classroom training) and training that the learner has booked that has no scheduled training date (e.g., Web-based training). The learner also may start an active Web-based training by selecting a "Start Now" hyperlink (not shown). Depending on the type of training, the current training activities section may display training details (e.g., information from the training catalog) or details about a scheduled training (e.g., participant list or training location).

The Top 10 section 530 displays a list of the training most frequently booked using the ELS. Optionally, Top 10 section also displays a specialized training list that lists training specific to a particular company, university, or organization.

Navigation section 540 displays controls for navigating through the learning portal. The navigation section includes links to a search tool 550, the training catalog 560, and the learner account 570. Navigation section 540 may also include links to other screens accessible via the learning portal.

The search tool 550 is used to search for training using a keyword contained in a title or a description of the training.

The search function may be used to find a training without having to browse through the training catalog. For example, if a learner wants to improve his or her knowledge of English, the learner may enter the keyword English and start a search. A resulting hit list (not shown) displays all training and delivery methods found that have the keyword English in the training title or description. The learner may select a training from the hit list and display further details about the training, such as training dates or prerequisite qualifications for the training.

The search tool includes an extended search feature that may be used to restrict the search criteria, for example, whether the keyword search should be executed for the training title or the training description. The learning interface may be automatically configured to display the extended search hyperlink if the search results contain more than a predetermined number of entries (e.g., more than 20 entries).

The training catalog (not shown) allows a learner to navigate through any training offered by the ELS. Training may be provided using several different delivery methods, such as online learning or classroom training. As described above, the learner may use the search features to find a specific training in the catalog.

Training may also be accessed from the list of subject areas in navigation section 540 and from the overall view provided by the training catalog. Subject areas constitute a thematic structuring of the offered trainings. The use of subject areas enables the training to be structured thematically rather than hierarchically and thus present a picture of the overall structure of the trainings. The learner may access a detailed screen (not shown) of a subject area and training.

Figure 6:
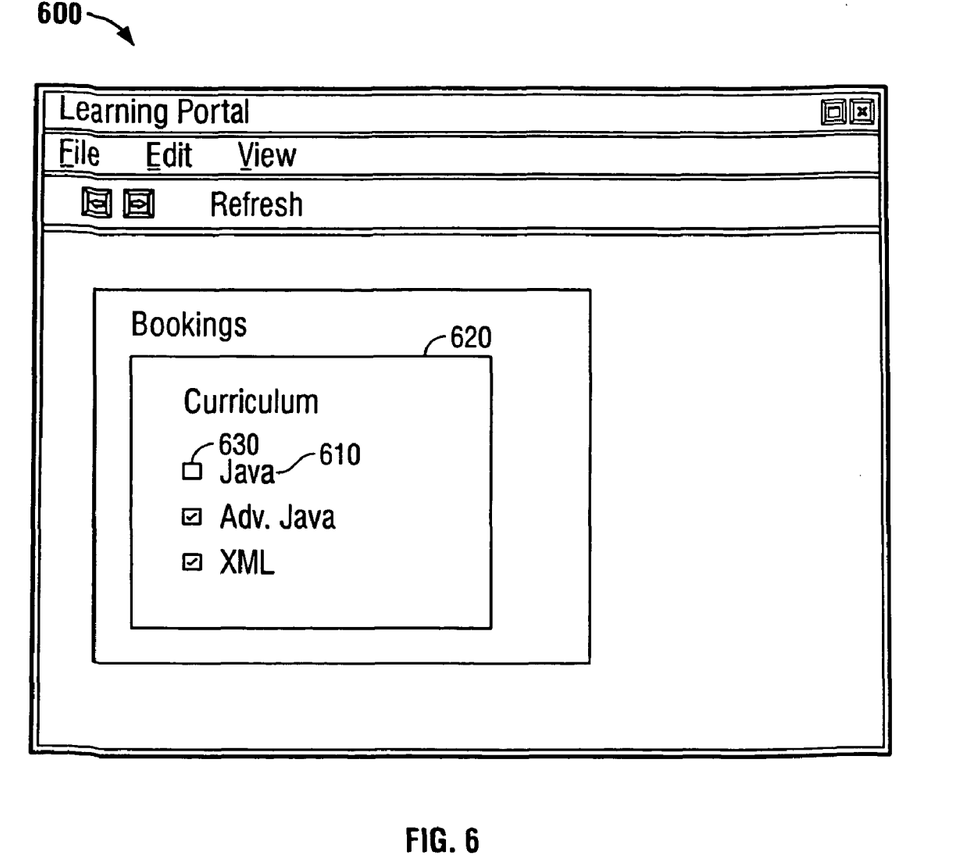
FIG. 6 is an example of a booking modification screen that is accessible via the learning portal.

FIG. 6 illustrates a booking modification screen 600 which constitutes part of the learning portal. In FIG. 6, the modification being illustrated is cancellation of an individual course booking 610 within a curriculum booking 620. The course booking 610 is cancelled by deselecting a check box 630 correlated with the course booking 610. Through such screens, learners can place bookings and modify bookings without administrative intervention. Processes for placing and modifying bookings are described herein above. Alternatively, an administrator may place a booking or modify a booking on behalf of a learner. Administrators may use the same, or different, processes as learners to place or modify a booking.

The curriculum management system can be implemented in digital electronic circuitry, or in computer hardware, firmware, software, or in combinations of them. The curriculum management system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the curriculum management system can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (Erasable Programmable Read-only Memory), EEPROM (Electrically Erasable Programmable Read-only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The curriculum management system can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The curriculum management system has been described in terms of particular embodiments. Other embodiments are within the scope of the following claims. For example, although the curriculum management system has been described as a component of a larger electronic learning system, it can also be implemented in other systems or as a stand-alone system.

What is claimed is:

1. A computer program comprising a memory device storing instructions that, when executed by a processor, cause the processor to perform a method for managing a curriculum, the method comprising the steps performed by the processor of:
scheduling a booking of a course to be taken by a learner, wherein the scheduling comprises generating an attendance link that associates the learner with the course, the attendance link identifying whether the course is associated with a corresponding curriculum;
receiving input from the learner requesting a modification to the booking;
determining whether the booking represents an individual booking or a curriculum booking based on the generated attendance link; and
processing the modification to the booking based on at least whether the booking represents an individual booking or a curriculum booking.

2. The computer program product of claim 1, wherein:
the modification comprises re-booking the course; and
processing the modification comprises not re-booking the course when the booking represents a curriculum booking.

3. The computer program product of claim 1, wherein:
the modification comprises re-booking the course; and
processing the modification comprises, when the booked course represents an individual booking:
performing a consistency check with respect to other courses in the curriculum; and
re-booking the course based on an outcome of the consistency check.

4. The computer program product of claim 1, wherein:
the modification comprises canceling the course; and
processing the modification comprises not canceling the course when the booking represents a curriculum booking.

5. The computer program product of claim 1, wherein:
the modification comprises canceling the course; and
processing the modification comprises, when the booking represents a curriculum booking:
canceling the course;
identifying one or more additional courses within the curriculum for which bookings are invalidated by canceling the course; and
canceling each of the identified additional courses.

6. The computer program product of claim 1, wherein:
the modification comprises canceling the course;
the course belongs to a sequence of courses within the curriculum; and
processing the modification comprises, when the booking represents a curriculum booking:
canceling the course;
identifying one or more additional courses within the curriculum that are later in the sequence of courses than the canceled course; and
canceling the identified additional courses that are later in the sequence than the canceled course.

7. The computer program product of claim 1, wherein:
the modification comprises a follow-up to the course; and
processing the modification comprises, when the booking is a curriculum booking:
not performing the follow-up to the course until the curriculum has been completed.

8. The computer program product of claim 1, wherein:
the modification comprises a follow-up to the course; and
processing the modification comprises, when the booking is a curriculum booking:
performing the follow-up to the course even if the curriculum has not been completed.

9. A computer-implemented method for managing a curriculum comprising:
scheduling, using a processor, a booking of a course to be taken by a learner, wherein the scheduling comprises generating an attendance link that associates the learner with the course, the attendance link identifying whether the course is associated with a corresponding curriculum;
receiving, using a processor, input from the learner requesting a modification to the booking;
determining, using a processor, whether the booking represents an individual booking or a curriculum booking based on at least the generated attendance link; and
processing, using a processor, the modification to the booking based on whether the booking represents an individual booking or a curriculum booking.

10. The method of claim 9, wherein:
the modification comprises re-booking the course; and
processing the modification comprises not re-booking the course when the booking represents a curriculum booking.

11. The method of claim 9, wherein:
the modification comprises re-booking the course; and
processing the modification comprises, when the booked course represents an individual booking:
performing a consistency check with respect to other courses in the curriculum; and
re-booking the course based on an outcome of the consistency check.

12. The method of claim 9, wherein:
the modification comprises canceling the course; and
processing the modification comprises not canceling the course when the booking represents a curriculum booking.

13. The method of claim 9, wherein:
the modification comprises canceling the course; and
processing the modification comprises, when the booking represents a curriculum booking:
canceling the course;
identifying one or more additional courses within the curriculum for which bookings are invalidated by canceling the course; and
canceling each of the identified additional courses.

14. The method of claim 9, wherein:
the modification comprises canceling the course;
the course belongs to a sequence of courses within the curriculum; and
processing the modification comprises, when the booking represents a curriculum booking:
canceling the course;
identifying one or more additional courses within the curriculum that are later in the sequence of courses than the canceled course; and
canceling the identified additional courses that are later in the sequence than the canceled course.

15. The method of claim 9, wherein:
the modification comprises a follow-up to the course; and
processing the modification comprises, when the booking is a curriculum booking:
not performing the follow-up to the course until the curriculum has been completed.

16. The method of claim 9, wherein:
the modification comprises a follow-up to the course; and
processing the modification comprises, when the booking is a curriculum booking:
performing the follow-up to the course even if the curriculum has not been completed.

* * * * *